(12) United States Patent
Dai et al.

(10) Patent No.: US 9,118,851 B2
(45) Date of Patent: Aug. 25, 2015

(54) HIGH DYNAMIC RANGE IMAGE SENSOR READ OUT ARCHITECTURE

(71) Applicant: OMNIVISION TECHNOLOGIES, INC., Santa Clara, CA (US)

(72) Inventors: Tiejun Dai, Santa Clara, CA (US); Jian Guo, Milpitas, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 92 days.

(21) Appl. No.: 14/086,832

(22) Filed: Nov. 21, 2013

(65) Prior Publication Data

US 2015/0138410 A1    May 21, 2015

(51) Int. Cl.
  *H04N 5/355*    (2011.01)
  *H04N 5/378*    (2011.01)
  *H04N 5/374*    (2011.01)
  *H04N 5/3745*   (2011.01)

(52) U.S. Cl.
  CPC ........... *H04N 5/35572* (2013.01); *H04N 5/378* (2013.01); *H04N 5/3745* (2013.01)

(58) Field of Classification Search
  CPC ...................................................... H04N 5/353
  See application file for complete search history.

(56) References Cited

U.S. PATENT DOCUMENTS

| | | | |
|---|---|---|---|
| 6,175,383 B1 | 1/2001 | Yadid-Pecht et al. | |
| 2009/0002528 A1* | 1/2009 | Manabe et al. | 348/248 |
| 2012/0033118 A1* | 2/2012 | Lee et al. | 348/296 |
| 2015/0055000 A1* | 2/2015 | Bock | 348/308 |

* cited by examiner

*Primary Examiner* — Timothy J Henn
(74) *Attorney, Agent, or Firm* — Blakely Sokoloff Taylor & Zafman LLP (57) ABSTRACT

A method of controlling a pixel array includes reading out image data from pixel cells of a row i of the pixel array with second transfer control signals that are coupled to be received by transfer transistors included in the pixels cells of the row of the pixel array that is being read out. Exposure times for pixel cells are independently controlled in other rows of the pixel array that are not being read out with first transfer control signals coupled to be received by transfer transistors included in the pixel cells in the other rows of the pixel array that are not being read out while the image data is read out from the pixel cells of row i of the pixel array.

16 Claims, 5 Drawing Sheets

HIGH DYNAMIC RANGE IMAGE SENSOR READ OUT ARCHITECTURE

BACKGROUND INFORMATION

1. Field of the Disclosure

The present invention is generally related to image sensors, and more specifically, the present invention is directed to high dynamic range image sensors.

2. Background

An image capture device includes an image sensor and an imaging lens. The imaging lens focuses light onto the image sensor to form an image, and the image sensor converts the light into electric signals. The electric signals are output from the image capture device to other components of a host electronic system. The electronic system may be, for example, a mobile phone, a computer, a digital camera or a medical device.

The demands on the image sensor to perform over a large range of lighting conditions, varying from low light conditions to bright light conditions are becoming more difficult to achieve as pixel cells become smaller. This performance capability is generally referred to as having high dynamic range imaging (HDRI or alternatively just HDR). High dynamic range imaging is a very desirable feature for a number of applications such as for example automotive and machine vision. In conventional image capture devices, pixel cells require multiple successive exposures such that the image sensor is exposed to both low and high light levels to achieve HDR. Traditional complementary metal oxide semiconductor (CMOS) image sensors suffer from low dynamic range due to limited well-capacity and fixed exposure times.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Examples in accordance with the teaching of the present invention describe an image sensor pixel cell for use in a high dynamic range (HDR) image sensor, including control circuitry for controlling exposure and reading out HDR image data from each pixel cell. As will be shown, a highly-programmable and high-efficiency exposure control and read out architecture is provided that improves the dynamic range performance. In various examples, in-frame programmable exposure control of each individual pixel cell across the pixel array is provided with multi-bit resolution, which achieves optimal operation of each pixel cell across the pixel array. Compared to known HDR imaging solutions, examples in accordance with the teachings of the present invention can achieve individual in-frame exposure control for each individual pixel cell, which lead to improved charge integration across the pixel array. Such exposure control and read out techniques in accordance with the teaching of the present invention eliminate the need for multi-frame combinations or down-sampling of pixel cell rows during read out, which lead to high frame rate and high spatial resolution in accordance with the teachings of the present invention.

Figure 1:
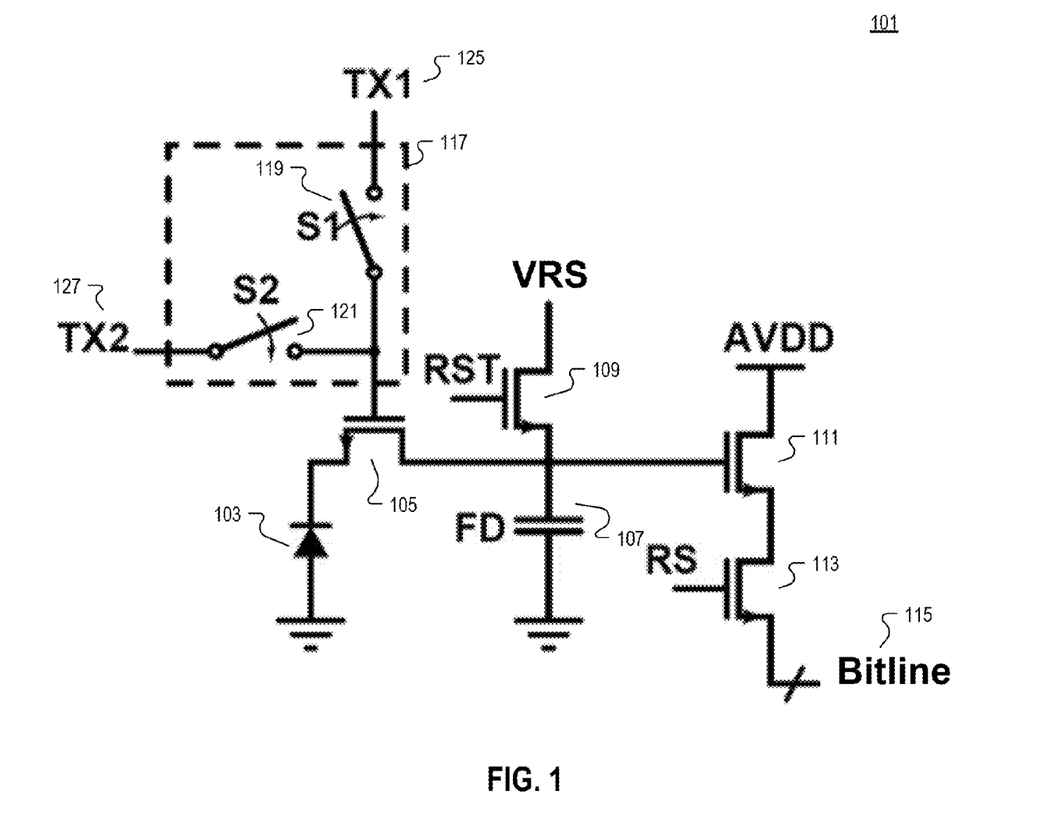
FIG. 1 is a circuit diagram showing an example of the circuitry of a pixel cell including a high dynamic range read out architecture in accordance with the teachings of the present invention.

To illustrate, FIG. 1 is a circuit diagram showing an example of a pixel cell 101 including a high dynamic range exposure control and read out architecture in accordance with the teachings of the present invention. As shown, pixel cell 101 includes a photodiode 103 that adapted to accumulate image charge in response to incident light. In one example, the incident light may be light that is focused onto the pixel cell through a lens and/or a filter. A transfer transistor 105 is coupled between the photodiode 103 and a floating diffusion 107 to selectively transfer the image charge accumulated in the photodiode 103 to the floating diffusion 107.

As shown in the depicted example, pixel cell 101 also includes a selection circuit 117 that is coupled to a control terminal of the transfer transistor 105 to select between a first transfer control signal TX1 125 or a second transfer control signal TX2 127 to control the transfer transistor 105 in accordance with the teachings of the present invention. In one example, selection circuit 117 includes a first switch S1 119 and a second switch S2 121, and only one of first transfer control signal TX1 125 or a second transfer control signal TX2 127 is active at a time. In one example, switch S2 121 of selection circuit 117 is coupled to provide second transfer control signal TX2 127 to the control terminal of the transfer transistor 105 to control the transfer transistor 105 during a read out operation of a row in which the transfer transistor 105 is included. In the example, switch S1 119 of selection circuit 117 is coupled to provide first transfer control signal TX1 125 to the control terminal of the transfer transistor 105 to control the transfer transistor 105 during a read out operation of a different row than the row in which the transfer transistor 105 is included.

Accordingly, first transfer control signal TX1 125 can be used to independently control the exposure of pixel cell 101 while a different row of the pixel array is being read out in accordance with the teachings of the present invention. Therefore, individual in-frame exposure control for each individual pixel cell 101 is realized, which leads to improved charge integration across the entire pixel array in accordance with the teachings of the present invention.

Continuing with the example depicted in FIG. 1, pixel cell 101 further includes a reset transistor 109 coupled to the floating diffusion 107 to selectively couple the reset voltage VRS to floating diffusion 107 in response to a reset signal RST to reset the floating diffusion 107. An amplifier transistor 111 having an amplifier gate is coupled to the floating diffusion 107. In the depicted example, amplifier transistor 111 is a source-follower coupled transistor having a drain terminal coupled to a voltage AVDD. As shown in the example, amplifier transistor 111 is coupled to provide an amplified signal at the source terminal of amplifier transistor 111 to a row select transistor 113, which is coupled to provide the image data from pixel cell 101 to a bitline 115 in response to a row select signal RS. As will be discussed, in one example, bitline 115 is one of a plurality of bitlines included in a pixel array to provide the image data from pixel cell 101 to read out circuitry in accordance with the teachings of the present invention.

Figure 2:
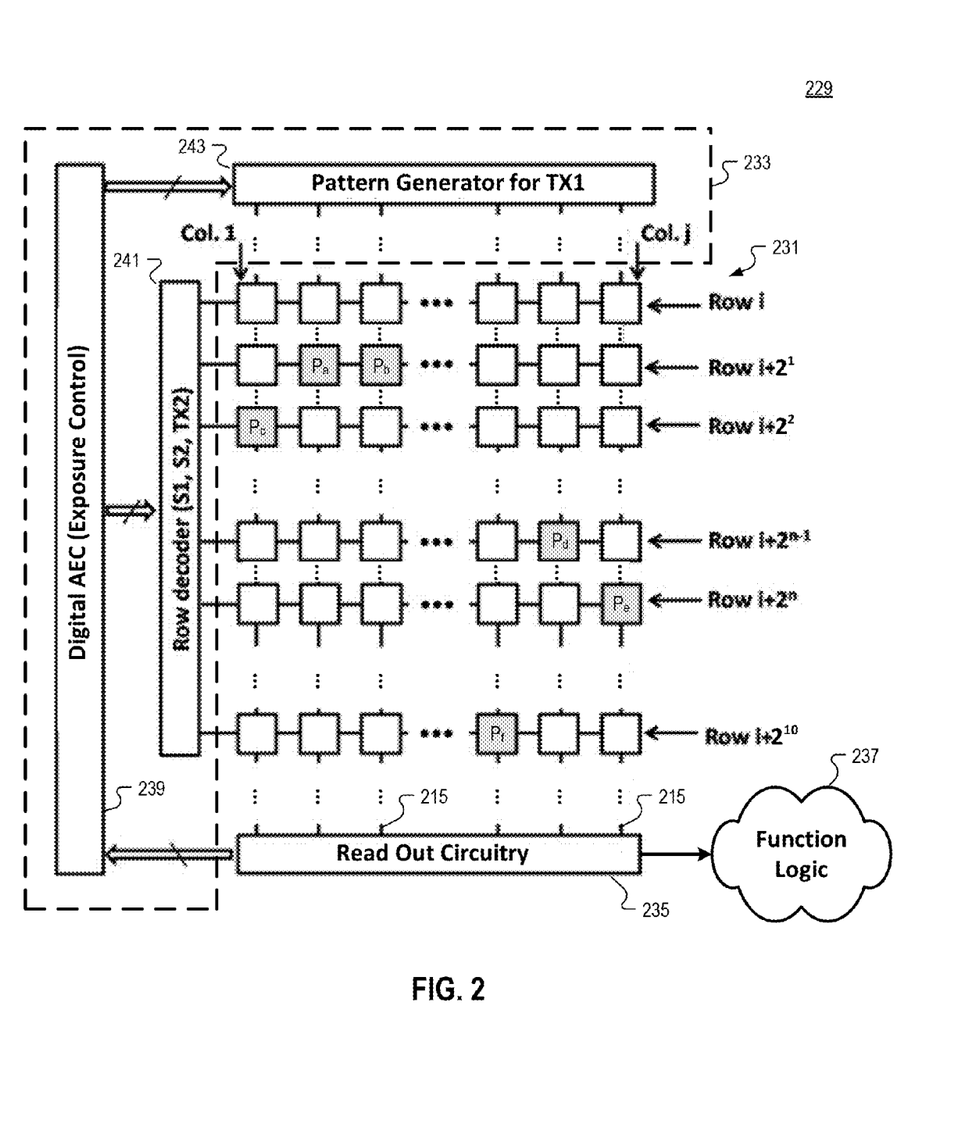
FIG. 2 is a block diagram illustrating an example imaging system including a pixel array of pixel cells having a high dynamic range read out architecture in accordance with the teachings of the present invention.

To illustrate, FIG. 2 is a block diagram illustrating an example imaging system 229 including a pixel array 231 of pixel cells having a high dynamic range read out architecture in accordance with the teachings of the present invention. In the illustrated example, it is appreciated that each of the pixel cells included in pixel array 231 of FIG. 2 may be examples of the pixel cells 101 of FIG. 1. Accordingly, it should be appreciated that similarly named and numbered elements referenced below are coupled and function as described above.

As shown in the example depicted in FIG. 2, control circuitry 233 is coupled to the pixel array 231 to control the operation of the pixel array 231 including independently controlling an exposure time for each one of the pixel cells in the pixel array 231 for a single frame in accordance with the teachings of the present invention. In the example, read out circuitry 235 is coupled to the pixel array 231 to read out image data from the plurality of pixel cells of pixel array 231 through a plurality of bitlines 215.

In one example, the image data that is read out by read out circuitry 235 is transferred to function logic 237. In one example, readout circuitry 235 may include amplification circuitry, analog-to-digital (ADC) conversion circuitry or otherwise. Function logic 237 may simply store the image data or even manipulate the image data by applying post image effects (e.g., crop, rotate, remove red eye, adjust brightness, adjust contrast or otherwise). Pixel array 231 may be implemented as a front side illuminated image sensor or a back side illuminated image sensor. As illustrated, each pixel cell is arranged into rows and columns in pixel array 231 to acquire image data of a person, place or object, which can then be used to render an image of the person, place or object.

As shown in the depicted example, the control circuitry 233 includes an automatic exposure control (AEC), which may also be referred to as exposure control circuit 239. In one example, exposure control circuit 239 is coupled to read the image data from read out circuitry 235 to determine, based on the image data values of pixel cells from a previous frame, any individual pixels in pixel array 231 that may benefit from additional exposure time in a subsequent frame to provide HDR imaging in accordance with the teachings of the present invention. In one example, exposure control circuitry is coupled to individually provide up to n+1 different exposure times for each one of the pixels in the pixel array 231 for the single frame to provide HDR imaging in accordance with the teachings of the present invention. In the example, control circuitry 233 includes a pattern generator 243 coupled to exposure control 239 and pixel array 231 to selectively provide the first transfer control signals TX1 to the transfer transistors included in the rows of the pixel array 231 that are not being read out in accordance with the teachings of the present invention. Control circuitry 233 also includes a row decoder 241 coupled to exposure control circuit 239 and the pixel array 231 to control the switches S1 and S2 in the selection circuits of each pixel cell and to provide the second transfer control signals TX2 to the transfer transistors that are included in the row of the pixel array 231 that is being read out from pixel array 231 in accordance with the teachings of the present invention.

In operation, example pattern generator 243 is used to generate first transfer control signal TX1 patterns to the pixel array 231 so that different exposure times can be applied to each individual pixel cells in pixel array 231 in a frame to provide HDR imaging in accordance with the teachings of the present invention. For instance, if it is assumed that $t_{row}$ is the read out time of a single row of pixel cells in pixel array 231, exposure times in one example can be controlled from $2^0 \times t_{row}$ to $2^n \times t_{row}$, where n is an integer from 1 to 10. As such, in this example, a 4-bit binary exposure control is provided to achieve HDR imaging in accordance with the teachings of the present invention. Indeed, this example illustrates a 10-bit dynamic range in exposure times, which when combined with an example column level 14-bit analog to digital converter (ADC) in the read out circuitry 235 leads to a read out architecture that can achieve a 24-bit dynamic range in accordance with the teachings of the present invention.

To illustrate, FIG. 2 show an example in which row i of a single frame is being read out from pixel array 231, and it is assumed that exposure control circuit 239 has determined from a previous frame that individual pixels $P_a$, $P_b$, $P_c$, $P_d$, $P_e$, and $P_f$ could benefit from additional exposure time in the single frame in order to achieve HDR imaging in accordance with the teachings of the present invention. As shown in the example, pixel $P_a$ is located at row $i+2^1$, column 2, pixel $P_b$ is located at row $i+2^1$, column 3, pixel $P_c$ is located at row $i+2^2$, column 1, pixel $P_d$ is located at row $i+2^{n-1}$, column j−1, pixel $P_e$ is located at row $i+2^n$, column j, and pixel $P_f$ is located at row $i+2^{10}$, column j−3. It should be appreciated of course that the locations of individual pixels $P_a$, $P_b$, $P_c$, $P_d$, $P_e$, and $P_f$ in FIG. 2 in rows $i+2^1, i+2^2, \ldots, i+2^{10}$ and columns 1 to column j are provided for explanation purposes and that the individual pixels that are required additional exposure time may be located at other locations in pixel array 231 in accordance with the teachings of the present invention.

Figure 3:
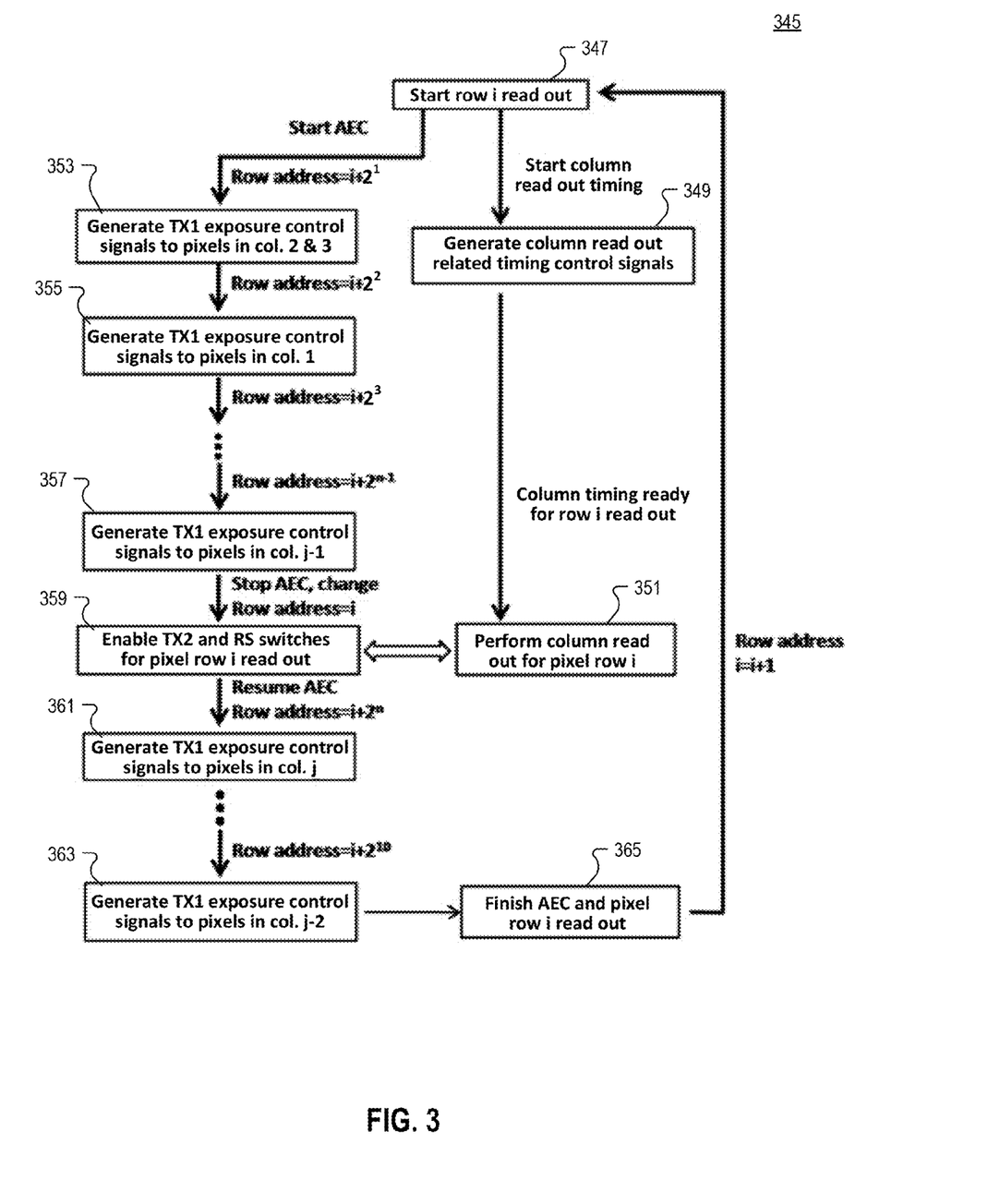
FIG. 3 is a flow diagram illustrating example processing that is performed to control and read out image data from an example imaging system including a pixel array of pixel cells having a high dynamic range read out architecture in accordance with the teachings of the present invention.

Continuing with the example described in FIG. 2, FIG. 3 is a flow diagram 345 illustrating an example of the processing performed to individually control the exposure times of pixels $P_a, P_b, P_c, P_d, P_e,$ and $P_f$ while reading out the image data from row i in the example imaging system 229 illustrated in FIG. 2 in accordance with the teachings of the present invention. In operation, as the pixel cells in each row i are read out, the exposure control and column timing is performed simultaneously. This allows high dynamic range exposure to be performed without sacrificing frame rate or spatial resolution in accordance with the teachings of the present invention.

Indeed, as will be described, FIG. 3 illustrates an example in which image data is read out from pixels cells of a row i of the pixel array with second transfer control signals TX2 coupled to be received by transfer transistors included in the pixels cells of the row of the pixel array that is being read out. In addition, exposure times are independently controlled for pixel cells in other rows≠i of the pixel array that are not being read out with first transfer control signals TX1 coupled to be received by transfer transistors included in the pixels cells in the other rows of the pixel array that are not being read out, while the image data is read out from the pixel cells of row i of the pixel array in accordance with the teachings of the present invention.

To illustrate, the processing of reading out row i starts at process block 347 of FIG. 3. At this point, the column read out timing is started to read out row i while the automatic exposure control is started simultaneously to individually control the exposure times for pixels in other rows in the pixel array that are not being read out in accordance with the teachings of the present invention. Process block 349 shows that column read out related timing control signals begin to be generated. After the column read out related timing control signals are ready, process block 351 shows that the column data read out of image data from the pixel cells of row i is then performed. In one example, the image data that is read out from the pixel cells in process block 351 is performed using the second transfer control signals TX2 and row select RS switches (i.e., as shown in process block 359 to be further discussed below) in accordance with the teachings of the present invention.

With respect to the rows≠i of the pixel array that are not being read out, the left portion of example flow diagram 345 shows that the exposure times are controlled using the first transfer control signals TX1 in individual pixel cells by sweeping through an initial portion of the other rows of the pixel array that are not being read out. The exposure times of the individual pixels in this initial portion are adjusted before the column read out related timing control signals are ready for the row i to be read out.

For instance, process block 353 in FIG. 3 shows when the row address is $i+2^1$, the TX1 exposure control signals are generated to the pixel cells in columns 2 and 3, which corresponds to pixel cells $P_a$ and $P_b$ in the example illustrated in FIG. 2. Process block 355 in FIG. 3 shows when the row address is $i+2^2$, the TX1 exposure control signals are generated to the pixel cell in column 1, which corresponds to pixel cell $P_c$ in the example illustrated in FIG. 2. Process block 357 in FIG. 3 shows when the row address is $i+2^{n-1}$, the TX1 exposure control signals are generated to the pixel cell in column j−1, which corresponds to pixel cell $P_d$ in the example illustrated in FIG. 2.

In the example, it is assumed that the column read out related timing control signals described on the right portion of example flow diagram 345 are now ready for the row i of the pixel array to be read out. In this example, the automatic exposure control is temporarily paused and the row address is set to i. Process block 359 shows that the second transfer control signals TX2 and the row select RS switches are enabled to enable process block 351 to read out of the image data from the pixel cells of row i.

In the example, after the pixel cells of row i are read out in process block 351, the remaining portion of other rows of the pixel array that are not being read out are swept through to independently control the exposure times with the first transfer control signals TX1 in accordance with the teachings of the present invention.

For instance, process block 361 in FIG. 3 shows that after the pixel cells of row i are read out in process block 351, the automatic exposure control is resumed and the row address is $i+2^n$. The TX1 exposure control signals are generated to the pixel cell in column j, which corresponds to pixel cell $P_e$ in the example illustrated in FIG. 2. Process block 363 in FIG. 3 shows when the row address is $i+2^{10}$, the TX1 exposure control signals are generated to the pixel cell in column j−2, which corresponds to pixel cell $P_f$ in the example illustrated in FIG. 2.

Process block 365 shows that after the automatic exposure control has finished adjusting the exposure times of the pixel cells in the other rows of the pixel array that are not being read out, and after row i has been read out, the row address is incremented to i+1 and processing loops back to process block 347 in accordance with the teachings of the present invention.

Continuing with the examples described above in FIGS. 2-3, FIG. 4 is a timing diagram 467 illustrating example signals found in example imaging system 229 of FIG. 2 in which the exposure times of pixels $P_a, P_b, P_c, P_d, P_e,$ and $P_f$ are individually controlled to provide HDR imaging while the image data from row i is read out in accordance with the teachings of the present invention. As shown in the example, and similar to the example described with respect to FIG. 3 above, when row i is being read out, the read out address is i. Before the column read out related timing control signals are ready for the pixel cells of row i to be read out, the TX2 (e.g., second transfer control signal TX2 127), S2 (e.g., switch S2 121), and the row select signal (e.g. RS signal at transistor 113) remain inactive as shown.

Figure 4:
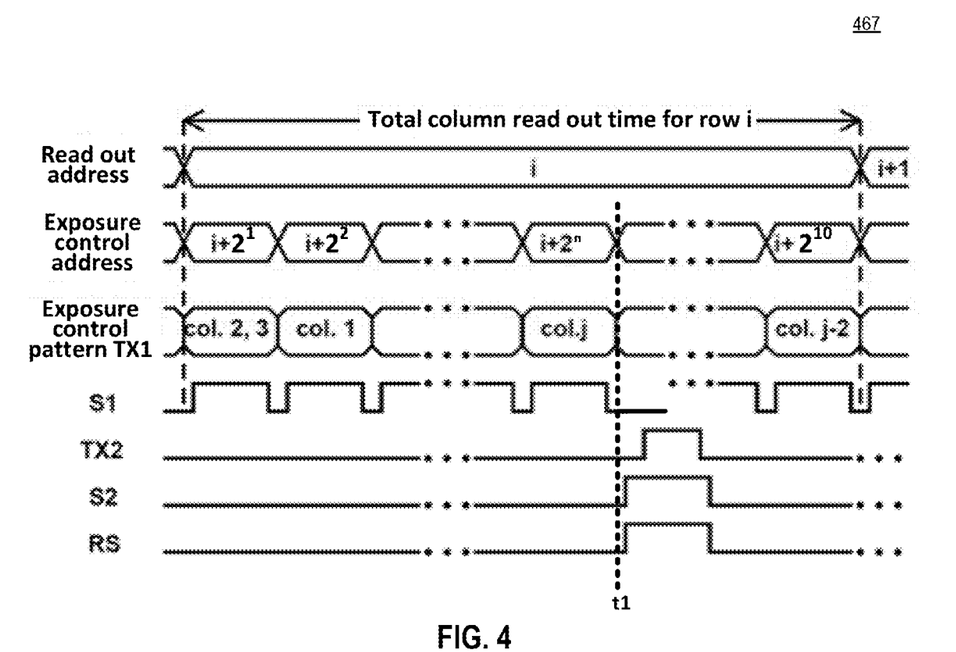
FIG. 4 is a timing diagram illustrating example signals found in an example imaging system including a pixel array of pixel cells having a high dynamic range read out architecture in accordance with the teachings of the present invention.

Similar to the example discussed above with respect to FIG. 3, while waiting for the column read out related timing control signals are ready for the pixel cells of row i to be read out, the exposure control circuit (e.g., exposure control circuit 239) individually adjusts the exposure times for pixel cells in an initial portion of the rows that are not being read out. As such, the exposure control address starts at address $i+2^1$, at which time the selection circuit (e.g., selection circuit 117) is set to activate switch S1 (e.g., switch S1 119) to enable the exposure control pattern for TX1 (e.g., first transfer control signal TX1 125) to adjust the exposure times for pixel cells $P_a$ and $P_b$ at columns 2 and 3 of row $i+2^1$. Next, the exposure control address is set to $i+2^2$, at which time the selection circuit (e.g., selection circuit 117) is set to activate switch S1 (e.g., switch S1 119) to enable the exposure control pattern for TX1 (e.g., first transfer control signal TX1 125) to adjust the exposure times for pixel cell $P_c$ at column 1 of row $i+2^2$. FIG. 4 shows that processing continues and the exposure control address is eventually set to $i+2^n$ just before time t1, at which time the selection circuit (e.g., selection circuit 117) is set to activate switch S1 (e.g., switch S1 119) to enable the exposure control pattern for TX1 (e.g., first transfer control signal TX1 125) to adjust the exposure times for pixel cell $P_e$ at column j of row i+2".

At time t1, it is assumed that the column read out related timing control signals are now ready for the pixel cells of row i to be read out. Accordingly, the TX2 (e.g., second transfer control signal TX2 127), S2 (e.g., switch S2 121), and the row select signals (e.g. RS signal at transistor 113) are activated and the S1 (e.g., switch S1 119) is deactivated as shown. At this time, the pixel cells of row i are read out.

In the example, after the pixel cells of row i are read out, the exposure control circuit (e.g., exposure control circuit 239) individually adjusts the exposure times for pixel cells in the remaining portion of the rows that are not being read out. As such, FIG. 4 shows that the exposure control address eventually sets the exposure control address to address i+$2^{10}$, at which time the selection circuit (e.g., selection circuit 117) is set to activate switch S1 (e.g., switch S1 119) to enable the exposure control pattern for TX1 (e.g., first transfer control signal TX1 125) to adjust the exposure time for pixel cell $P_f$ at column j–2 of row i+$2^{10}$.

After row i has been read out and the individual pixel cells of the other rows that are not read have the exposure times adjusted, the processing continues to read out the next row i+1 and adjust the exposure times of pixel cells in other rows that are not being read out in accordance with the teachings of the present invention.

Figure 5:
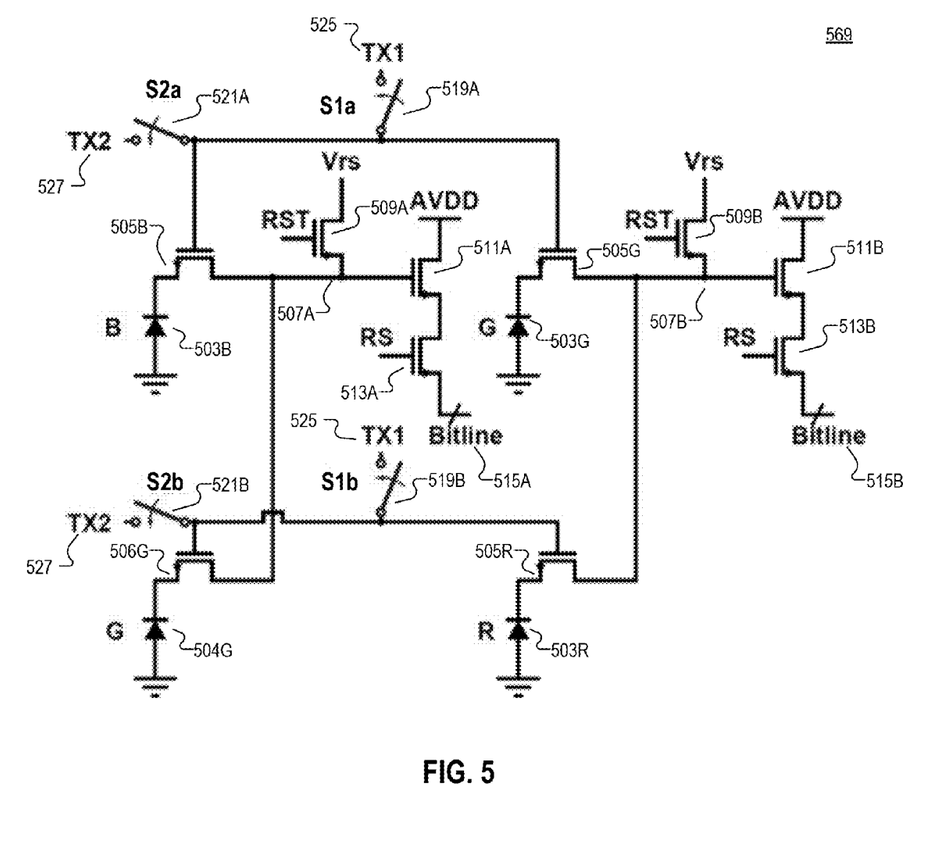
FIG. 5 is a circuit diagram showing an example of the circuitry of a color pixel cell including a high dynamic range read out architecture in accordance with the teachings of the present invention.

FIG. 5 is a circuit diagram showing an example of the circuitry of a color pixel cell 569 including a high dynamic range read out architecture in accordance with the teachings of the present invention. In the illustrated example, it is appreciated that pixel cell 569 of FIG. 5 shares many similarities with pixel cell 101 of FIG. 1. Accordingly, it should be appreciated that similarly named and numbered elements referenced below are coupled and function as described above.

In the illustrated example, pixel cell 569 includes a photodiodes 503R, 503G, 504G, and 505B arranged as shown to accumulate image charge in response to incident red, green, and blue light, respectively, in accordance with the teachings of the present invention. Accordingly, a color pixel cell 569 is provided. A transfer transistor 505B is coupled between the photodiode 503B and a floating diffusion 507A to selectively transfer the image charge accumulated in the photodiode 503B to floating diffusion 507A. Similarly, a transfer transistor 506G is coupled between the photodiode 504G and floating diffusion 507A to selectively transfer the image charge accumulated in the photodiode 504G to floating diffusion 507A.

In addition, transfer transistor 505G is coupled between the photodiode 503G and a floating diffusion 507B to selectively transfer the image charge accumulated in the photodiode 503G to floating diffusion 507B. Similarly, a transfer transistor 505R is coupled between the photodiode 503R and floating diffusion 507B to selectively transfer the image charge accumulated in the photodiode 503R to floating diffusion 507B.

As shown in the depicted example, pixel cell 569 also includes switches S1a 519A and S2a 521A, which may be considered as a first selection circuit, and which are coupled to the control terminals of the transfer transistors 505B and 505G to select between a first transfer control signal TX1 525 or a second transfer control signal TX2 527 to control the transfer transistors 505B and 505G in accordance with the teachings of the present invention. In one example, only one of first transfer control signal TX1 525 or a second transfer control signal TX2 527 is active at a time. In one example, switch S2a 521A is coupled to provide second transfer control signal TX2 527 to the control terminals of the transfer transistors 505B and 505G to control the transfer transistors 505B and 505G during a read out operation of a row in which the transfer transistors 505B and 505G is included. In the example, switch S1a 519A is coupled to provide first transfer control signal TX1 525 to the control terminals of the transfer transistors 505B and 505G to control the transfer transistors 505B and 505G during a read out operation of a different row than the row in which the transfer transistors 505B and 505G is included.

Continuing with the example depicted in FIG. 5, pixel cell 569 also includes a switches S1b 519B and S2a 521B, which may be considered as a second selection circuit, and which are coupled to the control terminals of the transfer transistors 506G and 505R to select between first transfer control signal TX1 525 or second transfer control signal TX2 527 to control the transfer transistors 506G and 505R in accordance with the teachings of the present invention. In one example, switch S2b 521B is coupled to provide second transfer control signal TX2 527 to the control terminals of the transfer transistors 506G and 505R to control the transfer transistors 506G and 505R during a read out operation of a row in which the transfer transistors 506G and 505R is included. In the example, switch S1b 519B is coupled to provide first transfer control signal TX1 525 to the control terminals of the transfer transistors 506G and 505R to control the transfer transistors 506G and 505R during a read out operation of a different row than the row in which the transfer transistors 506G and 505R is included.

Accordingly, similar to pixel cell 101 of FIG. 1, first transfer control signal TX1 525 of FIG. 5 can be used to independently control the exposure of pixel cell 569 while a different row of the pixel array is being read out in accordance with the teachings of the present invention. Therefore, individual in-frame exposure control for each individual pixel cell 569 is realized, which leads to improved charge integration across the entire pixel array in accordance with the teachings of the present invention.

Continuing with the example depicted in FIG. 5, pixel cell 569 further includes reset transistors 509A and 509B coupled to the floating diffusions 507A and 507B, respectively, to selectively couple the reset voltage Vrs to floating diffusions 507A and 507B, respectively, in response to a reset signal RST to reset the floating diffusions 507A and 507B. Amplifier transistors 511A and 511B include respective amplifier gates that are coupled to the floating diffusions 507A and 507B, respectively. In the depicted example, amplifier transistors 511A and 511B are source-follower coupled transistors having their respective drain terminals coupled to a voltage AVDD. As shown in the example, amplifier transistors 511A and 511B are coupled to provide respective amplified signals at their respective source terminals to respective row select transistors 513A and 513B, which are coupled to provide the image data from pixel cell 569 to bitlines 515A and 515B in response to row select signals RS as shown. In one example, bitlines 515A and 515 provide the image data from pixel cell 569 to read out circuitry, similar to for example read out circuitry 235 of FIG. 2 in accordance with the teachings of the present invention.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A method of controlling a pixel array, comprising:
   reading out image data from pixel cells of a row i of the pixel array with second transfer control signals coupled to be received by transfer transistors included in the pixels cells of the row of the pixel array that is being read out; and
   independently controlling exposure times for pixel cells in other rows of the pixel array that are not being read out with first transfer control signals coupled to be received by transfer transistors included in the pixel cells in the other rows of the pixel array that are not being read out while the image data is read out from the pixel cells of row i of the pixel array, wherein only one of the first and second transfer control signals coupled to be received by a transfer transistor included in a pixel cell is active at a time.

2. The method of controlling the pixel array of claim 1 wherein reading out image data from pixels cells of the row i of the pixel array comprises:
   starting column read out timing;
   generating column read out related timing control signals; and
   reading out the image data from the pixel cells of the row i of the pixel array with the second transfer control signals after the column read out related timing control signals are ready.

3. The method of controlling the pixel array of claim 2 wherein independently controlling the exposure times for pixel cells in the other rows of the pixel array that are not being read out comprises:
   sweeping through an initial portion of other rows of the pixel array that are not being read out before the column read out related timing control signals are ready for the row i of the pixel array to be read out to independently control the exposure times with the first transfer control signals in the pixel cells in the initial portion of the other rows of the pixel array that are not being read out;
   temporarily pausing the independent controlling of the exposure times with the first transfer control signals the pixel cells in the other rows of the pixel array after the column read out related timing control signals are ready for the row i of the pixel array to be read out; and
   sweeping through a remaining portion of other rows of the pixel array that are not being read out after the row i of the pixel array is read out to independently control the exposure times with the first transfer control signals in the pixel cells in the remaining portion of the other rows of the pixel array that were not read out.

4. The method of controlling the pixel array of claim 1 further comprising reading out image data from pixels cells of a next row i+1 of the pixel array.

5. The method of controlling the pixel array of claim 1 wherein reading out image data from pixels cells of the row i of the pixel array with the second transfer control signals comprises selecting the second transfer control signals to be coupled to the transfer transistors included in the pixels cells of the row of the pixel array that is being read out.

6. The method of controlling the pixel array of claim 1 wherein independently controlling the exposure times for pixel cells in the other rows of the pixel array that are not being read out comprises selecting the first transfer control signals to be coupled to the transfer transistors included in the pixels cells in the other rows of the pixel array that are not being read out.

7. An imaging system, comprising:
   a pixel array of pixel cells arranged into rows and columns, wherein each one of the pixel cells includes:
      a photodiode adapted to accumulate image charge in response to incident light;
      a transfer transistor coupled between the photodiode and a floating diffusion to selectively transfer the image charge accumulated in the photodiode to the floating diffusion; and
      a selection circuit coupled to a control terminal of the transfer transistor to select between a first and second transfer control signals to control the transfer transistor, wherein the second transfer control signal is coupled to control the transfer transistor during a read out operation of a row in which the transfer transistor is included, and wherein the first transfer control signal is coupled to control the transfer transistor during a read out operation of a different row than the row in which the transfer transistor is included;
   control circuitry coupled to the pixel array to control operation of the pixel array including independently controlling an exposure time for each one of the pixel cells in the pixel array for a single frame; and
   read out circuitry coupled to the pixel array to read out image data from the plurality of pixels.

8. The imaging system of claim 7 wherein the control circuitry comprises an automatic exposure control circuit coupled to provide up to n+1 different exposure times for each one of the pixels in the pixel array for the single frame.

9. The imaging system of claim 8 wherein $t_{row}$ is a read out time of a single row of the pixel array, and wherein the n+1 different exposure times range from $2^0 \times t_{row}$ to $2^n \times t_{row}$.

10. The imaging system of claim 7 wherein the control circuitry is coupled to generate the first and second transfer control signals to individually control exposure times for each one of the pixels in the pixel array for the single frame.

11. The imaging system of claim 7 wherein the control circuitry is coupled to provide the first transfer control signals to transfer transistors included in rows of the pixel array that are not being read out while the control circuit further provides the second transfer control signals to transfer transistors that are included in a row of the pixel array that is being read out.

12. The imaging system of claim 11 wherein the control circuitry further comprises a pattern generator coupled to the pixel array to provide the first transfer control signals to the transfer transistors included in the rows of the pixel array that are not being read out.

13. The imaging system of claim 11 wherein the control circuitry further comprises a row decoder coupled to the pixel array to provide the second transfer control signals to the transfer transistors that are included in the row of the pixel array that is being read out.

14. The imaging system of claim 7 further comprising function logic coupled to the read out circuitry to store the image data read out from the plurality of pixels.

15. The imaging system of claim 7 wherein each one of the pixel cells further includes:
   a reset transistor coupled to the floating diffusion to selectively reset the floating diffusion;

an amplifier transistor having an amplifier gate coupled to the floating diffusion; and a row select transistor coupled between a bitline and the amplifier transistor, wherein the bitline is coupled to the read out circuitry.

16. The imaging system of claim 7 wherein each one of the pixel cells is adapted to sense incident light having a color of one of red, green, or blue.

* * * * *